Feb. 2, 1937.   F. J. McGARRY   2,069,500

THEFT PREVENTING BOLT

Filed Feb. 8, 1933

INVENTOR

Francis J. McGarry

BY

ATTORNEYS

Patented Feb. 2, 1937

2,069,500

UNITED STATES PATENT OFFICE 2,069,500

THEFT PREVENTING BOLT

Francis J. McGarry, Detroit, Mich.

Application February 8, 1933, Serial No. 655,789

3 Claims. (Cl. 40—125)

The present invention pertains to a novel bolt, and more particularly to a bolt for attaching license plates to supporting brackets on automotive vehicles.

The primary object of the present invention is to provide means for securing license plates to supporting brackets on automobiles and like vehicles, the securing means being in the form of a bolt which must be broken in order to remove the plates.

Another object of the present invention is to provide means for securing license plates on automotive vehicles, the means comprising bolts that are so constructed that they must be broken in order to remove the plates and having fusible or inflammable elements bearing indicia corresponding to the indicia on the license plates in combination with which a particular set of bolts is used. In this manner the present invention provides means for readily detecting transferred license plates due to the fact that when the indicia on the bolts does not correspond to that on the license plates they indicate that a transfer has been made. A transfer of a set of bolts along with the license plates with which they were originally associated is impossible because the bolts must be broken in order to remove the plates from their original support, and because application of heat in an attempt to weld the broken parts of the bolt together would destroy the fusible or inflammable indicia bearing element.

Another object of the present invention is to provide a bolt head that is associated with a bolt in such a manner that application of external pressure on that head to rotate the same in one direction causes the head to rotate the bolt and application of pressure in the reverse direction causes the head to rotate relative to the bolt. Likewise a nut, which is adapted to be screwed onto said bolt, is provided with an actuating member that receives pressure from an external source to rotate the nut in one direction whereas rotative pressure in a reverse direction causes said actuating member to rotate freely on said nut.

With the above and other ends in view the invention consists in matters hereinafter set forth and more particularly pointed out in the appended claims, reference being had to the accompanying drawing, in which Figure 1 is an elevation of a license plate illustrating the present invention associated therewith;

Like characters of reference are employed throughout to designate corresponding parts.

Figure 1:
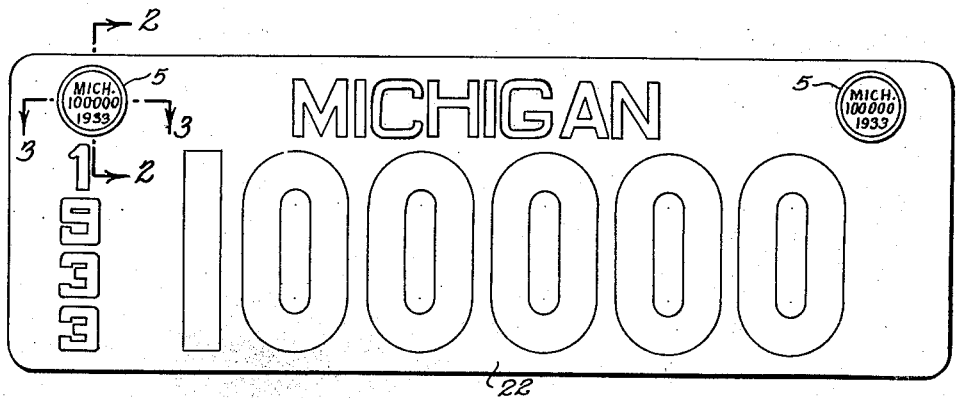
Figure 2:
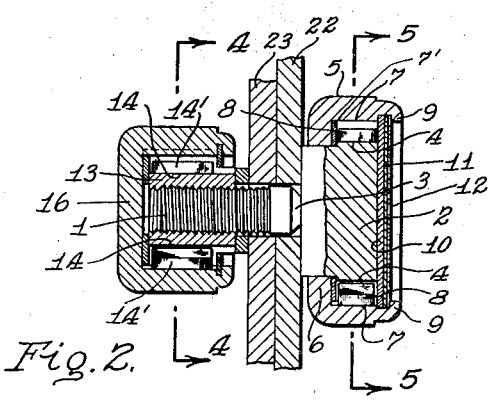
Fig. 2 is a cross section taken on the line 2—2 of Fig. 1.
Figure 3:
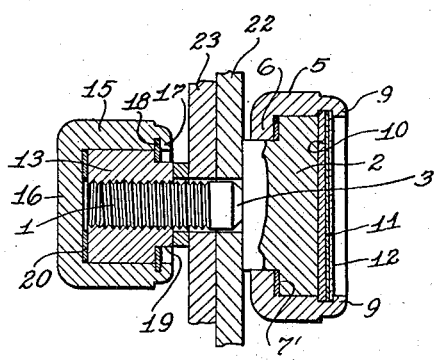
Fig. 3 is a cross section taken on the line 3—3 of Fig. 1.

The numeral 1 designates the threaded shank of the present anti-theft bolt, a circular head 2 being formed integral with said shank. Where the shank 1 joins the head 2 the shank is reduced in diameter to provide a weakened portion 3 the object of which is to insure severing the head from the shank before the threads on the shank could be stripped by attempting to remove a nut from the same by use of wedges or like implements. The circular head 2 is provided with diametrically opposite grooves 4.

Surrounding the head 2 is a sleeve 5 having an inwardly projecting flange 6, there being a washer 7', preferably a spring washer, interposed between the head 2 and the flange 5. The sleeve is provided with a pair of diametrically opposed recesses 7 that correspondingly decrease in depth in one direction. Loosely received in each groove 4 is a rectangularly shaped dog 8.

The outer end of the sleeve 5 is provided with an inwardly bent flange 9 which provides means for permanently securing the sleeve 5 on the head 2 by drawing the flange 6 toward the latter. Between the flange 9 and head 2 are interposed several disks, the disk 10 being a protective metal member, the disk 11 being of fusible or inflammable material, and the disk 12 being a transparency.

A nut 13 of substantially circular cross-section is screw-threaded internally so that it may be screwed onto the shank 1, the nut being provided with a pair of diametrically opposed grooves 14. In each groove 14 is loosely inserted a rectangularly shaped dog 14'. Surrounding the nut 13 is a cylindrical actuating member 15 having a closed end at 16 and an inwardly bent flange 17 that engages a disk 18 which is mounted on the reduced portion 19 of the nut. A spring washer 20 is interposed between the end 16 and the nut 13. The cylindrical actuating member 15 is provided with a pair of diametrically opposed recesses 21 that are gradually decreased in depth toward one end.

Figure 4:
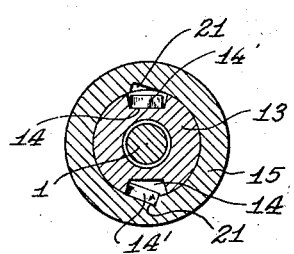
Fig. 4 is a cross section taken on the line 4—4 of Fig. 2.
Figure 5:
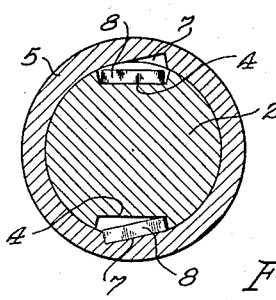
Fig. 5 is a cross section taken on the line 5—5 of Fig. 2.
Figure 6:
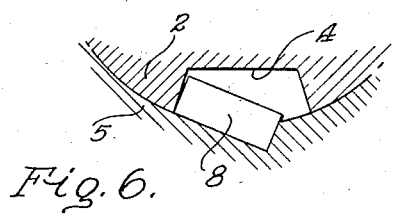
Fig. 6 is an enlarged fragmentary section.

In operation the two part nut is threaded home by rotating the actuating member 15 in the proper direction which is a clockwise direction in reference to Fig. 4. The dog 14' becomes locked in the position shown in the lower portion of Fig. 4 and establishes a driving connection between member 15 and nut 13, rotation in the opposite direction (contra-clockwise) causing the dog 14' to be brushed into the groove 14 in the position illustrated in the upper portion of Fig. 4. Similarly when the sleeve 5 is rotated in one direction the dog 8 creates a driving connection between head 2 and sleeve 5 whereas upon rotation in the opposite direction the dog is brushed into the groove 4.

The particular utility of the present bolt is in combination with an automobile license plate as shown. The plate is designated by numeral 22 and is secured to a bracket or supporting member 23 by a plurality of the present bolts. The disk 11 bears indicia corresponding to the indicia on the plate 22 and accordingly if the indicia on a set of bolts does not correspond to the indicia on the license plate an indication is given that the license plates have been transferred from their original support.

All the parts of the present securing means are formed of hardened metal, and more particularly the sleeve 5 and nut actuating member 15 so that it would be impossible to drill a hole and insert a pin that would engage both the sleeve 5 and head 2, or the actuating member 15 and nut 13 so that either the head or the nut could be rotated in a direction to remove the nut from the bolt.

Inasmuch as it is impossible to remove the nut from the bolt once it has been tightened thereon the only way in which the license plate could be removed from its supporting member is by breaking the bolt. Furthermore excessive rotative pressure applied in an attempt to strip the threads from the shank 1 would cause the bolt to break, the weakened portion 3 being so constructed that it would break as a result of application of less pressure than would be required to strip the threads. Once the bolt is broken it cannot be used again because of the fact that heat applied to the same in an attempt to weld the parts together would destroy the indicia bearing disk 11.

Although a specific embodiment of the present invention has been illustrated and described it is to be understood that various changes may be made in the details of construction without departing from the spirit of the invention as depicted by the following claims, and such changes are contemplated.

What I claim is:

1. A license plate fastener comprising a headed bolt and nut, and operating members for the head and nut, each operating member including a ratchet which holds when the member is turned in tightening direction and slips in the opposite direction, and indicia destructible by heat and carried by one of said members, and the shank of the bolt having a weakened section adjacent the member carrying the indicia.

2. A self-locking license plate fastener removable only by breaking, a weakened portion adjacent one end of said fastener, said weakened portion locating the normal point of breakage, and heat-destructible indicia carried by the end adjacent said weakened portion.

3. A device of the class described comprising a license plate fastener having a headed bolt and nut, said head and nut being adapted to clamp a license plate therebetween, operating members for the head and nut, each operating member including a ratchet which holds when the member is turned in tightening direction and slips in the opposite direction, whereby the said fastening device may be turned in either direction as a whole after being tightened by operating only the one of said operating members which holds when turned in the direction in which it is desired to turn said device, the operating member for said nut comprising a cap completely enclosing an end portion of the bolt, the operating member for said head comprising a sleeve and provided with a recess at the outer end thereof, and a disc in said recess bearing indicia having identifying significance with respect to the license plate.

FRANCIS J. McGARRY.